United States Patent [19]

Galloway

[11] Patent Number: 4,502,001

[45] Date of Patent: Feb. 26, 1985

[54] CURRENT BALANCING FOR BATTERY STRINGS

[75] Inventor: James H. Galloway, New Baltimore, Mich.

[73] Assignee: Energy Development Associates, Inc., Madison Heights, Mich.

[21] Appl. No.: 515,351

[22] Filed: Jul. 19, 1983

[51] Int. Cl.³ .............................. H02J 3/32; H02J 7/00
[52] U.S. Cl. ......................................... 320/6; 307/48; 307/53; 320/18; 363/90
[58] Field of Search ..................... 307/44, 48, 51, 53; 320/13–18, 23; 363/69, 70, 90

[56] References Cited

U.S. PATENT DOCUMENTS

| | | | |
|---|---|---|---|
| 2,949,568 | 8/1960 | Dortort | 317/26 |
| 2,994,028 | 7/1961 | Dortort | 363/70 |
| 3,013,200 | 12/1961 | Dortort | 363/70 |
| 3,042,848 | 7/1962 | Muchnick et al. | 363/90 |
| 3,042,849 | 7/1962 | Dortort | 363/69 |
| 3,956,638 | 5/1976 | Ahrens et al. | 320/23 X |
| 4,061,955 | 12/1977 | Thomas et al. | 320/15 X |
| 4,110,806 | 8/1978 | Murano et al. | |
| 4,274,043 | 6/1981 | Heitz | 320/14 X |
| 4,419,723 | 12/1983 | Wilson, Jr. | 363/90 X |

OTHER PUBLICATIONS

"Magnetic Amplifiers", by Herbert F. Storm, Copyright, 1955, General Electric Company.
Article "Introduction to the Theory of Magnetic Amplifiers", (pp. 62–86).
Article "Transient Response of the Saturable Reactor", (pp. 166–169).
Article "Applications of Saturable Reactors"—24, (pp. 389–410).

Primary Examiner—R. J. Hickey
Attorney, Agent, or Firm—Harness, Dickey & Pierce

[57] ABSTRACT

A battery plant is described which features magnetic circuit means for balancing the electrical current flow through a pluraliircuitbattery strings which are connected electrically in parallel. The magnetic circuit means is associated with the battery strings such that the conductors carrying the electrical current flow through each of the battery strings pass through the magnetic circuit means in directions which cause the electromagnetic fields of at least one predetermined pair of the conductors to oppose each other. In an alternative embodiment, a low voltage converter is associated with each of the battery strings for balancing the electrical current flow through the battery strings.

20 Claims, 6 Drawing Figures

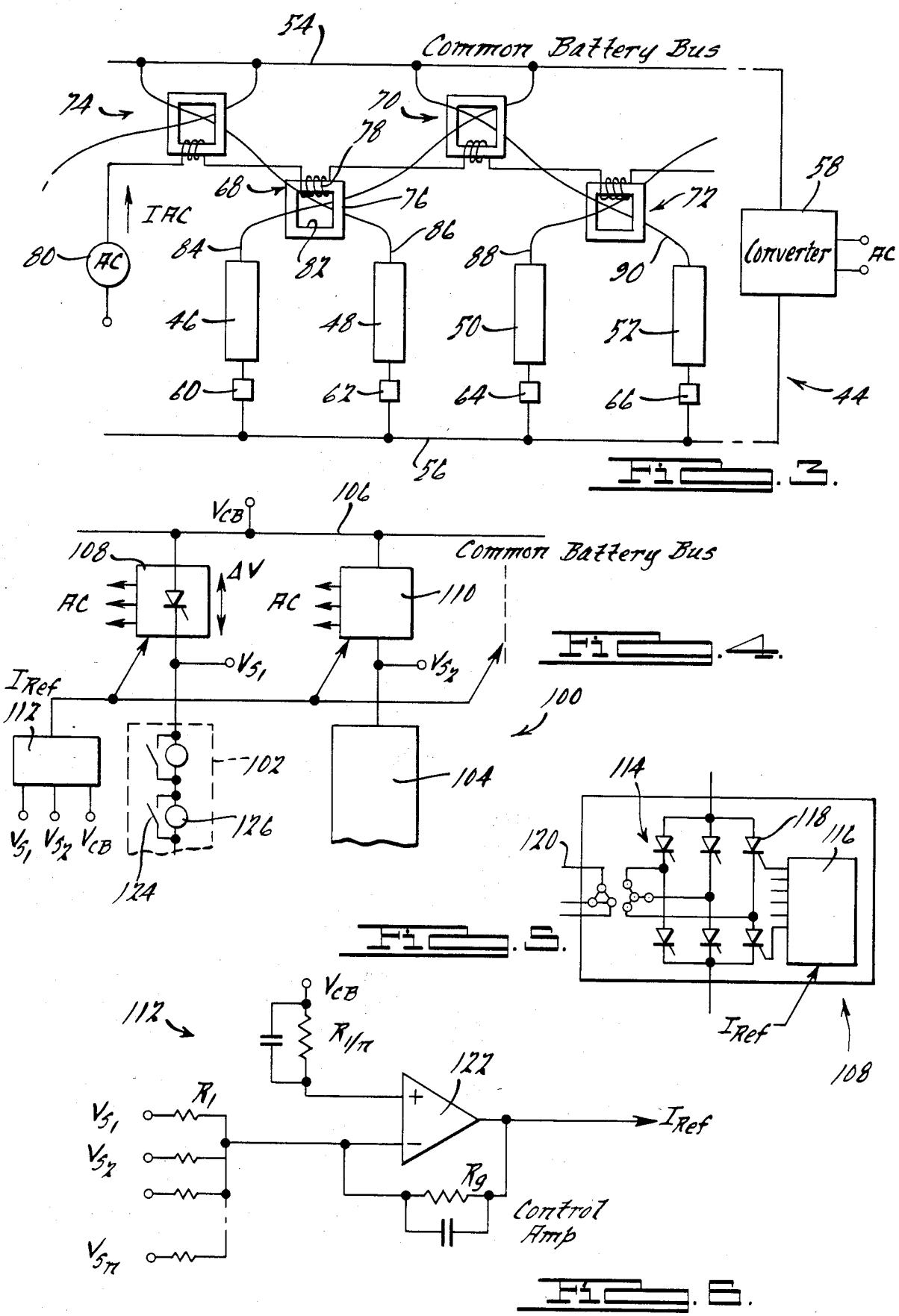

CURRENT BALANCING FOR BATTERY STRINGS

The Government of the United States of America has rights in this invention pursuant to Contract No. DE-AC02-78ET26923/II awarded by the U.S. Department of Energy.

BACKGROUND AND SUMMARY OF THE INVENTION

The present invention relates generally to electrochemical cells, and particularly to zinc-chlorine batteries combined to form a battery plant system.

Due to the increasing demand for electricity and the decreasing availability (and increasing cost) of distillate oil and natural gas, the need has arisen for an alternate method of supplying peak demand electricity. Presently, the electricity generated for peak demand is supplied from diesel engines and combustion turbines, which are fired by distillate oil and natural gas. One such method is the use of secondary energy storage batteries to store electricity generated from utility baseload facilities during the night or off-peak hours, and discharging these batteries during the hours of peak demand. Secondary energy storage batteries currently being considered for this application include lead-acid, lithium-iron sulfide, sodium sulfur, sodium-chloride, and zinc-chlorine batteries. In order to be utilized in this application, these batteries would necessarily have to be scaled up to battery plants capable of delivering electrical energy on the order of 100 mega-watt hours in a single discharge. This scale up would generally be achieved by combining large numbers of cells into module-type units, and interconnecting a suitable number of these modules.

One of the primary concerns in such a scale up, is the reliability of the battery plant. This reliability may generally be characterized as a function of the number of battery module failures. Since these modules would usually be connected electrically in series to form battery strings, the failure of a single module will affect the operation of the entire string. If the failure is such that the battery string must be disconnected from the electrical current flow in the battery plant, this has the effect of the failure of all of the battery modules in the string.

A bypass switch for redirecting electrical current around a failed battery module is described in the commonly assigned U.S. Pat. No. 4,287,267, entitled "Zinc-Chlorine Battery Plant System And Method", issued on Sept. 1, 1981 to Whittlesey et al., which is hereby incorporated by reference. This bypass switch permits only the failed battery module or modules to be effectively removed from the battery string by short circuiting the electrical power terminals of the failed modules(s).

Accordingly, the provision of a bypass switch in association with each battery module in the battery plant considerably enhances the reliability of the battery plant by enabling the battery string containing a failed module to continue to charge or discharge with the other battery strings. However, the removal of one or more battery modules in this way will give rise to an undesirable electrical current balance between the battery strings which are connected electrically in parallel by virtue of the lower voltage across the battery string having the failed module with respect to the voltages across the other battery strings. For example, if each battery string contained 20 battery modules each operating at 50 volts, the normal voltage across a battery string would be 1000 volts. If one of the battery modules failed and was removed from the battery string via a bypass switch, the instantaneous voltage of the battery string affected would be 950 volts. However, since all of the battery strings are connected electrically in parallel, a redistribution of the electrical current flow through the battery strings would automatically result in an effort to equalize the voltages across each of the battery strings. This redistribution of electrical current flow would mean a significant increase in the current flow in the battery string having the failed battery module with a concomitant decrease in the current flow through the remaining battery strings.

In the U.S. Pat. No. 4,287,267, this current imbalance problem was resolved by providing a separate converter bridge for each battery string so that variations in a battery string voltage could be compensated for by changing the thyristor firing angles. However, in accordance with the present invention, a magnetic technique is employed to balance the electrical current flow through the battery strings which does not require the provision of separate converter bridges for each battery string. Additionally, in an alternative embodiment a single high voltage converter is provided, and a low voltage converter associated with each battery string is used to balance the current flow.

Although the description below is directed specifically to zinc-chloride batteries, the present invention may also be utilized with other types of metal-halogen batteries and electrochemical systems which employ a plurality of battery strings which are connected electrically in parallel. With general reference to metal-halogen battery systems, these battery systems are generally comprised of three basic components, namely an electrode stack section, an electrolyte circulation subsystem, and a store subsystem. The electrode stack section typically includes a plurality of cells connected together electrically in various series and parallel combinations to achieve a desired operating voltage and current at the battery terminals over a charge/discharge battery cycle. Each cell is comprised of a positive and negative electrode which are both in contact with an aqueous metalhalide electrolyte. The electrolyte circulation subsystem operates to circulate the metalhalide electrolyte from a reservoir through each of the cells in the electrode stack in order to replenish the metal and halogen electrolyte ionic components as they are oxidized or reduced in the cells during the battery cycle. In a closed, self-contained metal-halogen battery system, the storage subsystem is used to contain the halogen gas or liquid which is liberated from the cells during the charging of the battery system for subsequent return to the cells during the discharging of the battery system. In the zinc-chloride battery system, chlorine gas is liberated from the positive electrodes of the cells and stored in the form of chlorine hydrate. Chlorine hydrate is a solid which is formed by the store subsystem in a process analogous to the process of freezing water where chlorine is included in the ice crystal.

With reference to the general operation of a zinc-chloride battery system, an electrolyte pump operates to circulate the aqueous zinc-chloride electrolyte from a reservoir to each of the positive or "chlorine" electrodes in the electrode stack. These chlorine electrodes are typically made of porous graphite, and the electrolyte passes through the pores of the chlorine electrodes into a space between the chlorine electrodes and the opposing negative or "zinc" electrodes. The electrolyte then flows up between the opposing electrodes or otherwise out of the cells in the electrode stack and back to the electrolyte reservoir or sump.

During the charging of the zinc-chloride battery system, zinc metal is deposited on the zinc electrode substrates and chlorine gas is liberated or generated at the chlorine electrode. The chlorine gas is collected in a suitable conduit, and then mixed with a chilled liquid to form chlorine hydrate. A gas pump is typically employed to draw the chlorine gas from the electrode stack and mix it with the chilled liquid, (i.e., generally either zinc-chloride electrolyte or water). The chlorine hydrate is then deposited in a store container until the battery system is to be discharged.

During the discharging of the zinc-chloride battery system, the chlorine hydrate is decomposed by permitting the store temperature to increase, such as by circulating a warm liquid through the store container. The chlorine gas thereby recovered is returned to the electrode stack via the electrolyte circulation subsystem, were it is reduced at the chlorine electrodes. Simultaneously, the zinc metal is dissolved off of the zinc electrode substrates, and power is available at the battery terminals.

Over the course of the zinc-chloride battery charge/discharge cycle, the concentration of the electrolyte varies as a result of the electrochemical reactions occurring at the electrodes in the cells of the electrode stack. At the beginning of charge, the concentration of zinc-chloride in the aqueous electrolyte may typically be 2.0 molar. As the charging portion of the cycle progresses, the electrolyte concentration will gradually decrease with the depletion of zinc and chloride ions from the electrolyte. When the battery system is fully charged, the electrolyte concentration will typically be reduced to 0.5 molar. Then, as the battery system is discharged, the electrolyte concentration will gradually swing upwardly and return to the original 2.0 molar concentration when the battery system is completely or fully discharged.

Further discussion of the structure and operation of zinc-chloride battery systems may be found in the following commonly assigned patents: Symons U.S. Pat. No. 3,713,888 entitled "Process For Electrical Energy Using Solid Halogen Hydrates"; Symons U.S. Pat. No. 3,809,578 entitled "Process For Forming And Storing Halogen Hydrate In A Battery"; Carr et al U.S. Pat. No. 3,909,298 entitled "Batteries Comprising Vented Electrodes And Method of Using Same"; Carr U.S. Pat. No. 4,100,332 entitled "Comb Type Bipolar Electrode Elements And Battery Stack Thereof". Such systems are also described in published reports prepared by the assignee herein, such as "Development of the Zinc-Chloride Battery for Utility Applications", Interim Report EM-1417, May 1980, and "Development of the Zinc-Chloride Battery for Utility Applications", Interim Report EM-1051, April 1979, both prepared for the Electric Power Research Institute, Palo Alto, Calif. A further description may be found in the commonly assigned U.S. co-pending patent application entitled "A Hydrogen Gas Relief Valve" by Curtis C. Whittlesey, filed on July 8, 1983, Ser. No. 510,401. An additional technique for resolving the current imbalance problem is also disclosed in the commonly assigned U.S. patent application Ser. No. 515,348, entitled "Device for Balancing Parallel Strings", by Matthew S. Mashikian which was filed on even date herewith. The specific teachings of the aforementioned cited references are incorporated herein by reference.

It is a principal objective of the pesent invention to provide an apparatus and method of balancing the electrical current flow through a plurality of battery strings which are connected electrically in parallel across common bus conductors and in which each of the battery strings is formed by a plurality of batteries connected electrically in series.

It is another objective of the present invention to provide a battery plant which will magnetically control the voltage across the common bus conductors for each battery string.

It is a further objective of the present invention to provide a battery plant which will magnetically prevent a redistribution of the electrical current flow through the battery strings in response to a failed battery in one or more of the battery strings.

It is an additional objective of the present invention to provide a battery plant which will magnetically prevent a redistribution of the electrical current flow through the battery strings in response to the removal of one or more batteries from a battery string.

It is yet another objective of the present invention to provide a battery plant which utilizes low voltage converters to balance the electrical current flow through the battery strings.

To achieve the foregoing objectives, the present invention provides a battery plant which features magnetic circuit means for balancing the electrical current flow through a plurality of battery strings which are connected electrically in parallel. The magnetic circuit means is associated with the battery strings such that the conductors carrying the electrical current flow through each of the battery strings pass through the magnetic circuit means in directions which cause the electromagnetic fields of at least one predetermined pair of the conductors to oppose each other. In an alternative embodiment, a low voltage converter is associated with each of the battery strings for balancing the electrical current flow through the battery strings.

Additional advantages and features for the present invention will become apparent from a reading of the detailed description of the preferred embodiments which make reference to the following set of drawings in which:

BRIEF DESCRIPTION OF THE DRAWINGS

FIG. 3 is a block diagram of a battery plant in accordance with the present invention.

FIG. 4 is a block diagram of a battery plant employing an alternative technique for balancing the electrical current flows through the battery strings.

FIG. 5 is a schematic representation of a low voltage converter circuit shown in FIG. 4.

FIG. 6 is a schematic diagram of the feedback circuit shown in FIG. 4.

DETAILED DESCRIPTION OF THE PREFERRED EMBODIMENTS

Figure 1:
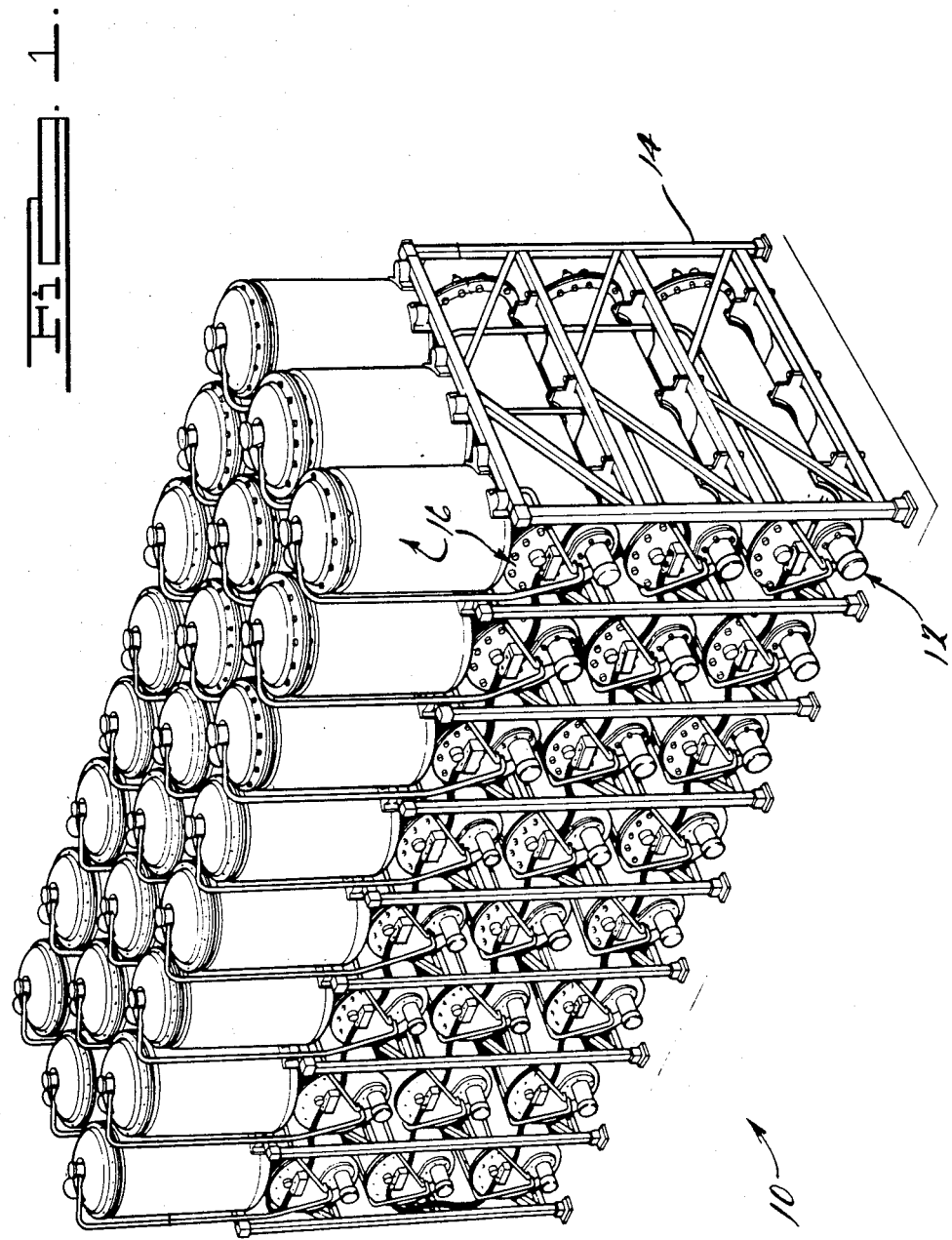
FIG. 1 is a perspective view of a zinc-chloride battery string for a battery plant in accordance with the present invention.

Referring to FIG. 1, a perspective view of a zinc-chloride battery string 10 is shown. The battery string 10 is generally comprised of twenty four zinc-chloride battery modules 12 connected electrically in series and mounted on a rack structure 14 in a three tier arrangement. Each of the battery modules 12 are comprised of two interconnected cylindrical vessels, as may best be seen with reference to FIG. 2.

Figure 2:
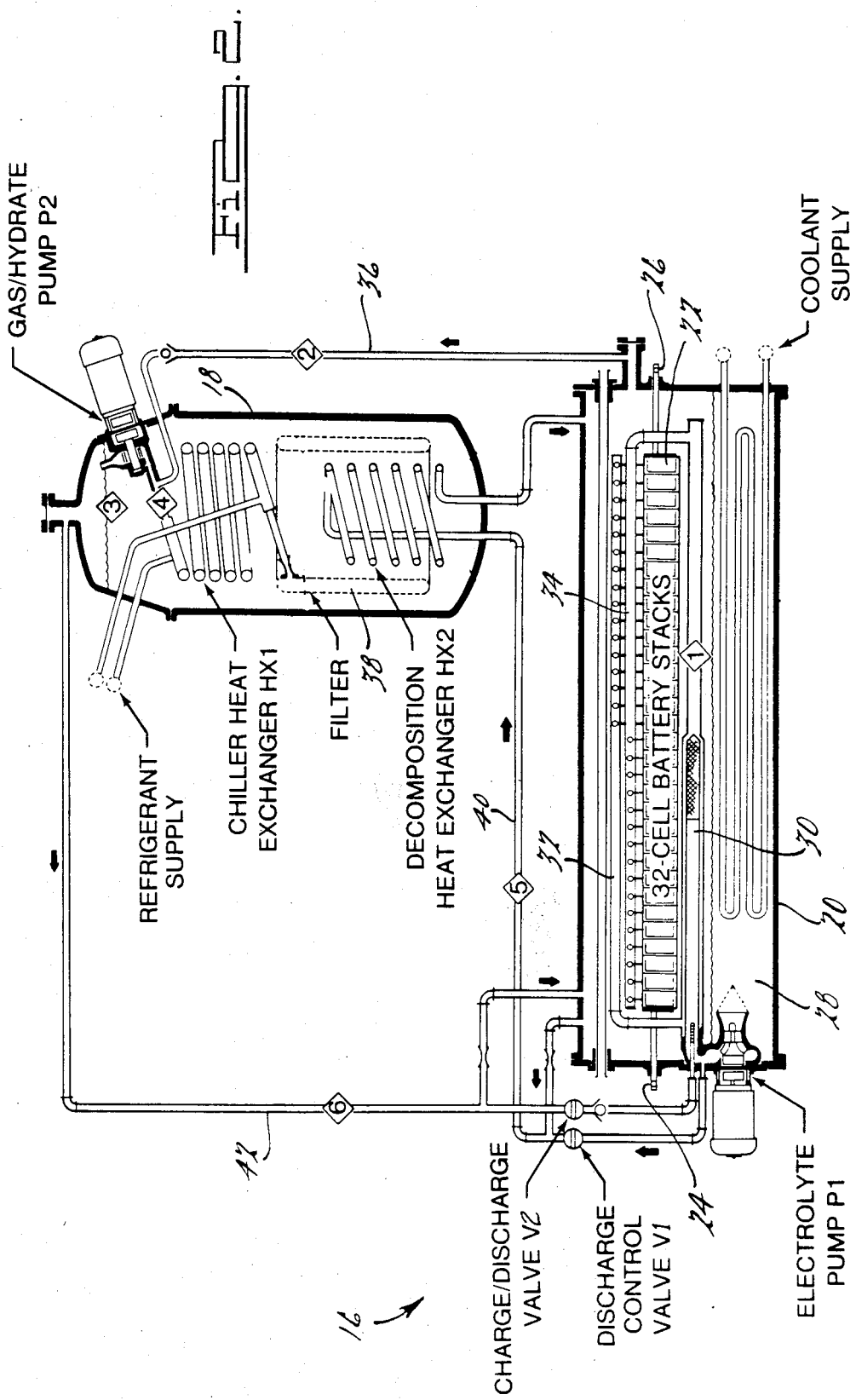
FIG. 2 is a schematic diagram of one of the zinc-chloride battery modules shown in FIG. 1.

FIG. 2 illustrates a schematic diagram of a zinc-chloride battery module 16 which forms part of the battery string 10. The upper vessel or case 18 is used to contain the chlorine hydrate store subsystem, while the lower vessel or case 20 is used to contain both the battery stack and the electrolyte circulation subsystem. The battery stack is comprised of two submodules 22 which each include thirty-two unit cells connected electrically in series. Only one of the submodules 22 is shown in FIG. 2 due to the fact that these submodules are physically aligned in parallel within the vessel 20. Terminals 24 and 26 are mounted to each of the submodules 22 in order to permit suitable external electrical connections to be made to the battery stack of the battery module 16. For example, the two submodules 22 may be connected electrically in parallel to provide an open circuit voltage of approximately sixty-eight volts for the battery module 16.

During the charging and discharging of the battery module 16, the electrolyte circulation subsystem provides a continuous supply of electrolyte to all of the cells contained in the battery stack submodules 22. Electrolyte is drawn from a reservoir or sump 28 by the electrolyte pump "P1", and pumped through a main manifold 30 to a pair of distribution conduits 32-34 for each submodule 22. Each of the distribution conduits 32-34 is designed to evenly distribute the zinc-chloride electrolyte to one half of the unit cells in the submodule. The unit cells then become quickly filled with electrolyte and overflow through a serpentine electrolyte return channel (not shown) back to the sump 28.

During the charging of the battery module 16, the submodules will generate chlorine gas which will be drawn through a conduit 36 to the hydrate store subsystem in the vessel 18 by the gas pump "P2". The gas pump P2 also mixes the chlorine gas with a liquid (preferably water in this embodiment) which has been chilled via heat exchanger "HX1". The output from the gas pump P2 is typically a chlorine hydrate slurry which gradually becomes compacted by virtue of the fact that the excess liquid in the slurry is drawn by the gas pump P2 through the filter 38.

During the discharge of the battery module 16, discharge control valve "V2" is opened, which permits warm electrolyte from the sump 28 to circulate through the decomposition heat exchanger "HX2" in the vessel 18 via conduit 40. The heat from the electrolyte is thereby transferred to the chlorine hydrate and causes the chlorine hydrate to gradually decompose. The discharge valve "V1" is also opened to permit the chlorine gas which is liberated from the decomposing hydrate to be conveyed through conduit 42 to the electrolyte circulation subsystem in the vessel 20. The chlorine gas is then injected into the main manifold 30, where it is dissolved and conveyed back to the unit cells of the submodules 22.

Referring to FIG. 3, a block diagram of a battery plant 44 in accordance with the present invention is shown. The battery plant 44 includes at least four battery strings 46-52 which are generally connected electrically in parallel across common bus conductors 54 and 56. The common bus conductors 54 and 56 are connected to a conventional converter 58 which provides the power conditioning equipment required for the battery plant 44. During the charging of the battery plant 44, the converter 58 converts A.C. electrical power from a utility grid system to D.C. electrical power on the bus conductors 54 and 56. Similarly, during the discharging of the battery plant 44, the D.C. electrical power generated by the battery strings 46-52 is converted to A.C. electrical power for use on the utility grid system, such as during the hours of peak demand. The battery plant 44 also includes a circuit breaker for each of the battery strings 46-52. These circuit breakers 60-66 are used for interrupting the D.C. electrical power being transmitted to or from the battery strings 46-52.

The battery plant 44 further includes magnetic circuits 68-72 for balancing the D.C. electrical current flow through the battery strings 46-52. A magnetic circuit 74 is also shown to illustrate how the chain of magnetic circuits would be continued when an additional battery string is added to the battery plant. Similarly, the electrical connections from the magnetic circuit 72 are not shown to be completed to illustrate that this magnetic circuit chain may be extended in order to balance the electrical current flow through as many battery strings as may be desired to be connected electrically in parallel in the battery plant 44.

Each of the magnetic circuits 68-74 is comprised of a saturable reactor which includes an iron core 76 and a bias winding 78. All of the bias windings 78 are connected electrically in series with an alternating current source 80 which forces the alternating current flow in each of the magnetic cores 76 to be equal. The magnetic cores 76 each provide a core window 82 through which a predetermined pair of conductors pass therethrough in directions which cause the electromagnetic fields of these conductors to oppose each other. These conductors are the electrical conductors 84-90 which carry the electrical current flow through each of the battery strings. The appropriate direction configuration may be provided, for example, by looping the conductors in each pair through the magnetic cores in opposite directions.

In operation, each of the magnetic circuits 68-74 will cause the electrical current flows through their respective conductor pairs to be equal. Since there is no control winding in these saturable reactors, each of the conductors in a conductor pair acts as a control winding for the other. When the electrical current flow through one of the conductors, such as conductor 84, is greater than the electrical current flow the other conductor in the conductor pair, such as conductor 86, the magnetic circuit will generate a conter potential in the magnetic core 76 and impress a voltage on the conductor 84 which will be sufficient to cause the current flows to be equal. In this regard, the magnetic circuit operates to force the algebraic sum of the opposing current flows in the conductors 84 and 86 to be zero.

Thus, it should be understood that the magnetic circuit 68 will balance the electrical current flows through the conductors 84 and 86, which the magnetic circuit 72 will balance the electrical current flows through the conductors 88 and 90. Nevertheless, since it may still be possible for the balanced electrical current flows through the conductors 84-86 to be different from the balanced electrical current flows through the conductors 88-90, the magnetic circuit 70 is provided to couple the magnetic circuits 68 and 72 such that equal current flows through the battery strings 46-52 will be assured.

Thus, one of the conductors from each of the conductor pairs 84–86 and 88–90 are selected to be passed through the magnetic core 76 of the magnetic circuit 70 in order to provide a conductor pair which will magnetically interlock the current flows through the conductor pairs 84–86 and 88–90. Accordingly, since the magnetic circuit 70 will force equal electrical current flows through the conductors 84 and 72, it will also cause the electrical current flows through the remaining conductors 86 and 88 to assume a magnitude equal to the electrical current flows through the conductors 84 and 90.

One example of an increase in current through a battery string is an increase which will result if one of the batteries in the battery string fails and is removed or short circuited such that the voltage for the battery string so affected will decrease with respect to the other battery strings. Since the battery strings 46–52 are connected in parallel across the common bus conductors 54 and 56, such a decrease in the voltage for one of the battery strings will cause a re-distribution of the electrical current flow through the battery strings. This re-distribution will channel a significant current increase through the battery string containing the failed module in an effort to increase the voltage of this battery string to the voltage levels of the other battery strings. In this regard, the magnetic circuits 68–74 will prevent this situation by impressing a voltage on the conductor carrying the current flow through the battery string with the failed battery which is equal to the voltage lost by virtue of the failed battery.

The power required to impress this additional voltage is derived from the alternating current source 80. Preferably, the alternating current source 80 should provide sufficient electrical power to increase the voltage in the conductor to compensate for the failure of at least one battery in the battery string. However, it should be appreciated that it may be desirable to provide sufficient electrical power to compensate for the failure of two batteries, and so forth. For example, if the current flowing through each of the battery strings 46–52 was 200 amps and the voltage across each battery in the battery strings was 50 volts, then for each failed battery, the alternating current source would have to supply 10 kw of electrical power to provide 50 volt increments. However, due to the linking of the magnetic circuits 68–74, some power sharing between the magnetic circuits will be provided which will reduce to some extent the electrical power which must be provided by the alternating current source 80.

It should also be noted that the magnetic circuits 68–74 may be referred to as "magnetic amplifiers" in that a large amount of electrical power from the alternating current source 80 is controlled by the relatively small voltage difference between the conductor portions in the presence of the magnetic circuit electromagnetic field when the current flows are unbalanced. It should also be noted that a detailed explanation of the general operation of saturable reactors when used as magnetic amplifiers may be found in "Magnetic Amplifiers" by H. F. Storm, published by John Wiley & Sons, Inc., 1955, which is hereby incorporated by reference.

It should also be understood that the magnetic core 76 for each of the magnetic circuits 68–74 do not have to be separate core structures, and that other suitable core structures may be employed in the appropriate application. For example, it may be desirable to use a shell-type core structure which has a central core for separating the two core windows.

Referring to FIG. 4, a block diagram of a portion of a battery plant 100 employing an alternative technique for balancing electrical current flows is shown. The battery plant 100 includes at least two battery strings 102 and 104 which are connected electrically in parallel across common bus conductors (only common bus conductor 106 is shown). The battery plant 100 includes a low voltage converter circuit which is connected electrically in series with each of the battery strings 102 and 104. These converter circuits 108 and 110 are responsive to a control signal, $I_{ref}$, which is generated by a control circuit 112.

A schematic representation of one of the low voltage converters 108–110 is shown in FIG. 5. Specifically, the converter circuit 108 is shown to include a six-pulse thyristor bridge 114, and a conventional current controlled trigger circuit 116 for gating the individual thyristors 118. The thyristor bridge is used to control the three phase electrical power being supplied by a source of alternating current along conductors 120. The converter circuits 108 and 110 are referred to as being low voltage converters because they need only be designed to have a voltage rating corresponding to the operating voltage of one or a few batteries in each battery string. Whereas, the main converter for the battery plant 100 must necessarily have a voltage rating which corresponds to the combination of all of the battery operating voltages in the battery strings. Thus, it should be understood that the converter circuits 108 and 110 need only have sufficient capacity to balance the electrical current flows over a limited voltage range.

It should also be understood that while only one thyristor bridge 114 is shown in FIG. 5, the converters 108 and 110 will include an additional thyristor bridge for balancing the electrical current flows in the opposite direction, as the direction of the electrical current flow through the battery strings reverses from charge to discharge. Alternatively, suitable switching means may be provided in the converter circuits 108 and 110 to permit the use of only one thyristor bridge.

Referring to FIG. 6, a schematic diagram of the control circuit 112 is shown. The control circuit 112 includes an operational amplifier 122 which is arranged in a configuration to average the voltages across the battery strings ($V_s$, $V_{s2}$ and so forth) and create a feedback loop which sets the reference current $I_{ref}$, to the converter circuits 108–110 so that the average difference voltages will be zero.

Referring again to FIG. 4, it should be noted that the battery string 102 is shown to include the use of a bypass switch 124 connected across the terminal of each of the batteries 126 in the battery string. Accordingly, FIG. 4 illustrates how a bypass, such as described in the above-identified U.S. Pat. No. 4,287,267, can be used to effectively remove a failed battery by short-circuiting the failed battery. Thus, only the failed battery need be removed from the battery string in order to permit the rest of the batteries in the affected battery string to continue operating.

The various embodiments which have been set forth above were for the purposes of illustration and were not intended to limit the invention. It will be appreciated by those skilled in the art that various changes and modifications may be made to these embodiments described in this specification without departing from the spirit and scope of the invention as defined by the appended claims.

I claim:

1. In a battery plant having a plurality of battery strings connected electrically in parallel where each of said battery strings is formed by a plurality of batteries connected electrically in series, the improvement comprising:
   magnetic circuit means for balancing the electrical current flow through said battery strings, said magnetic circuit means being associated with said battery strings such that conductors carrying the electrical current flow through each of said battery strings pass through said magnetic circuit means in directions which cause the electromagnetic fields of at least one predetermined pair of said conductors to oppose each other.

2. The invention according to claim 1, wherein said battery strings are connected electrically in parallel across common bus conductors, and said magnetic circuit means balances the electrical current flow through said battery strings by impressing a voltage on at least one of said conductors which will cause the electrical current flows through said battery strings to be equal.

3. The invention according to claim 2, wherein said battery plant has two battery strings.

4. The invention according to claim 3, wherein said magnetic circuit means comprises a saturable reactor having a bias winding connected to a source of alternating current, and a magnetic core having a core window through which said conductors for said two battery strings pass therethrough.

5. The invention according to claim 4, wherein said battery plant has at least three battery strings.

6. The invention according to claim 5, wherein said magnetic circuit means comprises a plurality of saturable reactors having magnetic core structures which provide core windows through which predetermined pairs of said conductors pass through in a magnetically coupling arrangement which forces the electrical current flows through each of said battery strings to be equal, and a bias winding for each said saturable reactors, said bias windings being connected electrically in series with a source of alternating current.

7. The invention according to claim 6, wherein said magnetic core structures comprise separate magnetic cores, each of which providing a core window through which a predetermined pair of said conductors pass therethrough.

8. The invention according to claim 7, wherein said magnetically coupling arrangement includes at least one of said conductors passing through two of said magnetic core windows.

9. A battery plant system comprising:
   power conditioning means for converting alternating current electrical power to direct current electrical power during the charging of said battery plant and converting direct current electrical power to alternating current electrical power during the discharging of said battery plant;
   a plurality of battery strings connected electrically in parallel across common bus conductors to said power conditioning means;
   a plurality of battery modules connected electrically in series to form each of said battery strings;
   bypassing switching means, in association with each of said battery modules, for redirecting electrical current flow around a failed battery module in response to a failure condition; and
   magnetic circuit means for balancing the electrical current flow through said battery strings in response to at least one failed battery module, said magnetic circuit means being associated with battery strings such that conductors carrying the electrical current flow through each of said battery strings pass through said magnetic circuit means in directions which cause the electromagnetic fields of at least one predetermined pair of said conductors to oppose one another.

10. The invention according to claim 9, wherein said battery strings are connected electrically in parallel across common bus conductors, and said magnetic circuit means balances the electrical current flow through said battery strings by impressing a voltage on at least one of said conductors which will cause the electrical current flows through said battery strings to be equal.

11. The invention according to claim 10, wherein said battery plant has two battery strings.

12. The invention according to claim 11, wherein said magnetic circuit means comprises a saturable reactor having a bias winding connected to a source of alternating current, and a magnetic core having a core window through which said conductors for said two battery strings pass therethrough.

13. The invention according to claim 10, wherein said battery plant has at least three battery strings.

14. The invention according to claim 13, wherein said magnetic circuit means comprises a plurality of saturable reactors having magnetic core structures which provide core windows through which predetermined pairs of said conductors pass through in a magnetically coupling arrangement which forces the electrical current flows through each of said battery strings to be equal, and a bias winding for each said saturable reactors, said bias windings being connected electrically in series with a source of alternating current.

15. The invention according to claim 14, wherein said magnetic core structures comprise separate magnetic cores, each of which providing a core window through which a predetermined pair of said conductors pass therethrough.

16. The invention according to claim 7, wherein said magnetically coupling arrangement includes at least one of said conductors passing through two of said magnetic core windows.

17. The invention according to claim 9, wherein said battery plant systems is a zinc-chloride battery plant system.

18. A battery plant system, comprising:
   power containing means for converting alternating current electrical power to direct current electrical power during the charging of said battery plant and converting direct current electrical power to alternating current electrical power during the discharging of said battery plant;
   a plurality of battery strings conected electrically in parallel across common bus conductors to said power conditioning means;
   a plurality of battery modules connected electrically in series to form each of said battery strings;
   control circuit means for providing a control signal which is a function of the voltage across said common bus conductors and an average of the voltages across said battery strings; and
   converter means in association with each of said battery strings and connected to a source of alternating current for balancing the electrical current flow through said battery strings in response to said control signal by equalizing the voltages across said common bus conductors for each of said battery strings.

19. The invention according to claim 18, wherein said battery plant system includes bypass switching means in association with each of said battery modules for redirecting electrical current flow around a failed battery module in response to a failure condition.

20. The invention according to claim 19, wherein said battery plant system is a zinc-chloride battery plant system.

* * * * *